United States Patent Office 3,476,789
Patented Nov. 4, 1969

3,476,789
METHOD FOR PREPARING TRI-HYDRODICYCLO-PENTADIENYL ALUMINUM AND SUBSTITUTED DERIVATIVES THEREOF
Guenter Bruno, Somerville, N.J., assignor to Mobil Oil Corporation, a corporation of New York
No Drawing. Filed Sept. 19, 1966, Ser. No. 580,202
Int. Cl. C07f 5/06
U.S. Cl. 260—448       2 Claims

ABSTRACT OF THE DISCLOSURE

Tri-hydrodicyclopentadienyl aluminum and its derivatives are produced by a non-catalytic displacement reaction of a dicyclopentadiene with a branched-chain aluminum alkyl at 90–110° C.

---

This invention is directed to organoaluminum compounds. It is more particularly concerned with tri-hydrodicyclopentadienyl aluminum and its derivatives; and with a process for their preparation.

As is well known to those familiar with the art, aluminum trialkyls and dialkyl aluminum hydrides are readily converted to other aluminum trialkyls or dialkyl aluminum hydrides by a displacement (transalkylation) reaction with α-monoolefins. For example, triisobutyl aluminum can be reacted with ethylene to form triethyl aluminum and isobutylene. The displacement reaction also takes place with cyclic monoolefins having 4, 5, 7, and 8 carbon atoms in the ring. In the case of diolefins having a cycloolefinic group and a vinyl side chain (e.g. 3-vinyl-1-cyclohexene), the displacement reaction occurs with the vinyl group and not with the cycloolefinic double bond (U.S. Patent 2,835,689).

On the other hand, however, dicyclopentadiene does not appear to undergo the displacement reaction with tri-n-alkyl aluminums (U.S. Patent 2,826,598). Instead, it has been reported that tri-n-alkyl aluminums will *add across* the double bond in the endomethylene ring of dicyclopentadiene. For example, a reported reaction is:

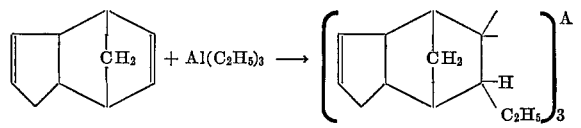

It is the surprising discovery of this invention that dicyclopentadiene and substituted derivatives thereof will undergo the displacement reaction with branched-chain aluminum alkyls, instead of adding across the double bond.

Accordingly, it is a broad object of this invention to provide novel organoaluminum compounds and a method for preparing them. A specific object is to provide tri-hydro-dicyclopentadienyl aluminum compounds. Another object is to provide a process for preparing such compounds. Other objects and advantages of this invention will become apparent to those skilled in the art, from the following detailed description.

This invention provides compounds having the formula:

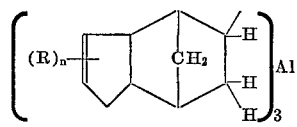

wherein R is hydrogen, alkyl ($C_1$–$C_4$), aryl, alkoxy ($C_1$–$C_4$), aryloxy, or alkyl ($C_1$–$C_4$) mercapto and $n$ is 1 to 2.

It also provides a process for preparing tri-hydrodicyclopentadienyl aluminum compounds that comprises reacting a compound having the formula:

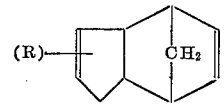

wherein R is hydrogen, alkyl ($C_1$–$C_4$), aryl, alkoxy ($C_1$–$C_4$), aryloxy, or alkyl ($C_1$–$C_4$) mercapto with an aluminum compound reacting having the formula, $X_nAlY_{(3-n)}$, wherein $n$ is 0 or 1, X is hydrogen or Y, and Y is

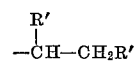

or —$CH_2CHR'_2$ in which R' is alkyl ($C_1$–$C_6$).

In addition to tri-hydrodicyclopentadienyl aluminum, non-limiting examples of the compounds of this invention are tri-methylhydroicyclopentadienyl aluminum, tri-butylhydrodicyclopentadienyl aluminum, tri-phenylhydrodicyclopentadienyl aluminum, tri-isopropoxyhydrodicyclopentadienyl aluminum, tri-ethoxyhydrodicyclopentadienyl aluminum, tri-tolyloxyhydrodicyclopentadienyl aluminum, tri - ethylmercaptohydrodicyclopentadienyl aluminum, tri-butylmercaptohydrodicyclopentadienyl aluminum, and tri-dimethylhydrodicyclopentadienyl aluminum.

The dicyclopentadiene reactants used to prepare the compounds of this invention include, by way of non-limiting example, dicyclopentadiene, methyldicyclopentadiene, methylcyclopentadiene dimer, butyldicyclopentadiene, phenyldicyclopentadiene, isopropoxydicyclopentadiene, ethoxydicyclopentadiene, tolyloxydicyclopentadiene, ethylmercaptodicyclopentadiene, and butylmercaptodicyclopentadiene. It is preferable that these compounds be purified prior to use by suitable methods well known in the art, e.g., by distillation over sodium-potassium alloy. The diene compounds may, however, be used in their commercially available grades of purity, at the expense of a slight decrease in yield and/or purity of the displacement reaction product.

Although it is possible to use for the displacement reaction all organoaluminum compounds of the previously described structure as starting materials, a preferred embodiment of the invention consists, because of their inexpensive commercial availability and the gaseous nature of the olefin generated in the displacement reaction, of the use of triisobutyl aluminum or diisobutyl aluminum hydride. Other aluminum trialkyls or dialkyl aluminum hydrides which can be used include:

tri-(2-ethyl-hexyl) aluminum
di-(2-ethyl-hexyl) aluminum hydride
tri-(2-methyl-pentyl) aluminum
tri-diisobutyl aluminum (tri-(2-,4,4-trimethyl-pentyl) aluminum)
tri-(α-methyl styryl) aluminum (tri-2-phenyl-propyl) aluminum)
di-diisobutyl aluminum hydride
di-(sec-pentyl) aluminum hydride
di-(sec-heptyl) aluminum hydride
triisopropyl aluminum to name only a few. All these compounds with the exception of the last are directly accessible from in turn comparatively easy accessible olefins by either total synthesis with aluminum and hydrogen, or by displacement reaction with (preferably) triisobutyl aluminum or diisobutyl aluminum hydride.

Extensive experimentation undertaken in the laboratories of the applicant has revealed that the reaction of organoaluminum compounds of the aforedescribed type with dicyclopentadiene or its alkyl-, aryl-, etc. substituted derivatives (A) Does essentially not proceed, or proceeds at a practically useless rate at temperatures below 80° C., (B) Decays above 110° C. and especially at temperatures above 120° C. to an increasing degree (dependent upon the time-temperature relationship) with formation of dimeric and polymeric products, (C) Proceeds *under conventional conditions* (excluding the so-called "short time high temperature" version of the displacement) satisfactory only within the comparatively narrow temperature range of 80–120° C., especially 90–110° C., and is then not an addition reaction as heretofore reported—with the exception, of course, of hydride reaction—but a displacement reaction. The term "satisfactory" is here intended to pertain to the progress and the overall net results and to the prevention or at least minimization of the side and/or subsequent reactions mentioned in (B).

A suitable pressure range for the conduct of the reaction is that between 12 mm. Hg and atmospheric pressure. It may, however, on occasion be possible or advantageous to conduct the reaction at a pressure lower than 12 mm. Hg or higher than 1 atm.

Because of the viscosity of the reaction product which increases considerably and progressively even at temperatures of approx. 100° C. as the action proceeds, it is moreover advisable to conduct the reaction in the presence of an inert solvent. Such a solvent is selected from the classes of solvents which are known to be indifferent towards organoaluminum compounds and which have a boiling point high enough to permit the conduct of the reaction at the abovementioned temperatures. Especially aliphatic, araliphatic, aromatic and certain halogenated aromatic hydrocarbons may be used. Examples for such solvents are cyclohexane, heptane, octane, isooctane, decane, Decalin, Tetralin, ethylbenzene, benzene, toluene, xylene, α-methylnaphthalene, cholorbenzene, and others.

It is furthermore essential to conduct the reaction in presence of a carrier for the displaced olefin. As such, an inert gas like $N_2$, He or Ar, which is bubbled through the reaction mixture, may be used. However, it is preferable to use the refluxing solvent as a carrier.

Thus, the choice and quantity of solvent used will depend on the employed reaction pressure. For instance, in one preferred embodiment of the invention, triisobutyl aluminum (or diisobutyl aluminum hydride) is heated at atmospheric pressure to 100° C., and then as much benzene or cyclohexane are added as in necessary to obtain a good reflux rate on the condenser at this internal temperature; thereafter the dicyclopentadiene compound is added either batchwise or continuously.

In another preferred embodiment of the invention triisobutyl aluminum (or diisobutyl aluminum hydride) is heated in a vacuum of 16 mm. such as can conveniently be created by means of a water jet pump, to a temperature of approx. 100° C. and then as much Tetralin is added to the vigorously stirred aluminum alkyl as is needed to obtain a good reflux rate on the condenser at this internal temperature; thereafter dicyclopentadiene is added continuously in vacuo at such a rate as is necessary in order to maintain the aforementioned internal temperature.

If desired, the solvent can be distilled, preferably in vacuo, from the reaction product after the reaction is completed. This operation, however, gives frequent rise to problems, since it is not advisable to exceed in such a distillation temperatures above 80° C. and especially not above 100° C., because of possible secondary reactions of the tri-hydrodicyclopentadienyl aluminum compound (especially dicyclopentadiene dimerization) and/or possible decomposition, e.g., with formation of di-hydrodicyclopentadienyl aluminum hydride and dicyclopentadiene. Moreover, the reaction product becomes increasingly and extremely viscous at the distillation temperature as the solvent is evaporated, so that consequently removal of even a low-boiling solvent even in vacuo becomes more and more difficult. However, in most cases it will be desirable, advantageous or even mandatory to leave the reaction product in the dissolved state for purposes of easiness of handling, transferring etc. Furthermore the solvents suggested for the displacement reaction are not believed to exert any disadvantageous effects in conveivable subsequent reactions of tri-hydrodicylopentadienyl aluminum compounds with other reagents.

Using organoaluminum compounds of the above described structures, especially isobutyl aluminum compounds, as starting materials we did not observe the heretofore reported *addition* of aluminum trialkyls to dicyclopentadiene, when the reaction was conducted at temperatures of 110–120° C. In this temperature range, however, substantial dicyclopentadiene dimerization occurred also. In order to minimize this dimerization, which proceeds according to

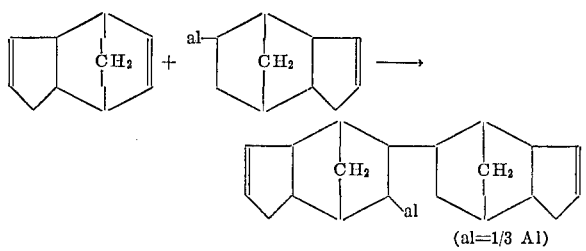

(al=1/3 Al)

it is suggested to add the diene to the organoaluminum compounds (not vice versa) at the reaction temperature, preferably continuously, over the whole period of the run, and at the rate of the generation of the displaced olefin.

Tri-hydrodicyclopentadienyl aluminum compounds may be used as cocatalysts for the polymerization of mono- and especially of diolefins, or for cyclo-oligomerizing or cyclocooligomerizing such monomers. The compound may further be used as chemical intermediate for the production of α-aluminum-ω-hydrodicyclopentadienyl hydrocarbons as described in copending application Ser. No. 580,170 filed concurrently herewith.

Example 1

A 743 g. quantity=5.2 moles of diisobutyl aluminum hydride, (iso-$C_4H_9$)$_2$AlH (purified by distillation at 100° C./$10^{-4}$ mm Hg, purity approx. 96%), was heated in a 5-liter 4-neck indented flask equipped with a mechanical stirrer, two addition funnels, a reflux condenser and a thermometer, at atmospheric pressure to an internal temperature of between 96–100° C. Then 2065 g.=15.6 moles of dicyclopentadiene (purified by distillation over sodium-potassium alloy, purity as established by VPC analysis and determination of the Hydrogenation Number approx. 94%, crystalline, $N_D^{35}$=1.5046) were added continuously in the molten state from one of the addition funnels (which was equipped with a heating mantle heated to 45° C. by means of a constant temperature circulator) to the vigorously stirred diisobutyl aluminum hydride over a period of approx. 14 hours. Simultaneously as much benzene (purified by distillation over sodium-potassium alloy) was added discontinuously to the reaction mixture as was necessary to obtain vigorous reflux on the condenser at the reaction temperature (96–100° C. internal, 105–110° C. external) during the whole period of the run, and to compensate for the increasing viscosity of the reaction solution; altogether 1262 g. of benzene were gradually added. After all dicyclopentadiene had been added the reaction solution was further kept at the aforemenetioned temperature for additional 4½ hours. Thereafter the evolution of isobutene (observed on a bubbler connected to the top of the reflux condenser) had practically ceased, and the reaction mixture was now allowed to cool to room temperature.

Liquid condensate (540 g.) had accumulated in the overhead receiver (a 2-liter flask provided with a cut-off gas inlet tube and a gas outlet) which had been connected to the top of the reflux condenser, and which was cooled with acetone/Dry Ice to −70° C. throughout the run. VPC analysis of a sample of this condensate showed it to have the following composition:

| | Percent |
|---|---|
| Isobutene=84.6% of the theoretical yield | 91.8 |
| Benzene | 7.9 |
| Unidentified components | 0.3 |

A 152 g. quantity of the benzene solution of the reaction product was hydrolyzed with the calculated amount of aqueous sulfuric acid. After the usual work-up and solvent distillation 90 g. of hydrolysis product were obtained, containing 67.3 g. of dihydrodicyclopentadiene as determined by VPC analysis. This corresponds to a yield of tri-hydrodicyclopentadientyl aluminum in the original benzene solution of the reaction product of 74.5% of the theoretical.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for preparing tri-hydrodicyclopentadienyl aluminum compounds that consists of reacting a dicyclopentadiene compound having the formula:

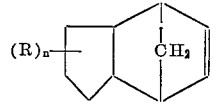

wherein R is selected from the group consisting of hydrogen, alkyl ($C_1$–$C_4$), aryl, alkoxy ($C_1$–$C_4$), aryloxy, and alkyl ($C_1$–$C_4$) mercapto and $n$ is 1 to 2, with an aluminum compound reactant having the formula, $X_rAlY_{(3-r)}$, wherein $r$ is 0 to 1, X is selected from the group consisting of hydrogen and Y, and Y is selected from the group consisting of

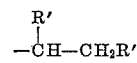

and —$CH_2CHR'_2$, in which R' is alkyl ($C_1$–$C_6$) at 90–110° C.

2. The method defined in claim 1, wherein said dicyclopentadiene compound is dicyclopentadiene and said aluminum compound reactant is diisobutyl aluminum hydride.

References Cited

UNITED STATES PATENTS

| | | |
|---|---|---|
| 2,826,598 | 3/1958 | Ziegler et al. |
| 2,835,689 | 5/1958 | Ziegler et al. |
| 2,906,763 | 9/1959 | McKinnis. |
| 3,358,008 | 12/1967 | Marcus. |

TOBIAS E. LEVOW, Primary Examiner

H. M. S. SNEED, Assistant Examiner